United States Patent [19]

Katzen

[11] 4,369,199
[45] * Jan. 18, 1983

[54] PROCESS FOR IMPROVING THE HEALTH OF ANIMALS

[76] Inventor: Sol Katzen, Hanasi #62, Herzliya Pituach, Israel

[*] Notice: The portion of the term of this patent subsequent to Mar. 7, 1995, has been disclaimed.

[21] Appl. No.: 909,189

[22] Filed: May 24, 1978

[51] Int. Cl.³ .............................................. A23K 1/00
[52] U.S. Cl. .................................. 426/641; 426/644; 426/626; 426/807
[58] Field of Search ...................... 71/15, 21; 426/641, 426/644, 626, 623, 630, 635, 636, 74, 805, 495, 807, 2; 127/37

[56] References Cited

U.S. PATENT DOCUMENTS

| 517,661 | 4/1884 | Powter | 71/15 |
|---|---|---|---|
| 517,662 | 4/1884 | Powter | 71/3 |
| 1,105,607 | 8/1914 | Benjamin | 71/23 |
| 1,190,953 | 7/1916 | Renshaw | 426/636 |
| 1,325,787 | 12/1919 | Grossman | 210/13 |
| 1,420,596 | 6/1922 | Webster | 71/21 |
| 1,430,182 | 9/1922 | Peck | 210/44 |
| 1,472,320 | 10/1923 | Beckman | 426/636 |
| 1,718,297 | 6/1929 | Maclachlan | 71/21 |
| 2,708,630 | 5/1955 | Davis | 426/495 |
| 2,744,824 | 5/1956 | Lent | 426/285 |
| 3,050,383 | 8/1962 | Wilson | 71/11 |
| 3,212,932 | 10/1965 | Hess et al. | 127/37 |
| 3,251,716 | 5/1966 | Porter | 127/37 |
| 3,294,826 | 12/1966 | O'Neill | 260/412.7 |
| 3,331,676 | 7/1967 | Roblin | 71/21 |
| 3,595,665 | 7/1971 | Huitson et al. | 424/317 |
| 3,692,530 | 9/1972 | Graham | 426/636 |
| 3,697,651 | 10/1972 | Khan et al. | 424/128 |
| 3,718,504 | 2/1973 | Whittingham | 426/635 |
| 3,767,416 | 10/1973 | Lee | 426/636 |
| 3,776,188 | 12/1973 | Komakine | 426/2 X |
| 3,875,317 | 4/1975 | Ferguson | 426/495 |
| 3,950,562 | 4/1976 | Senior | 426/431 |
| 3,968,254 | 7/1976 | Rhodes et al. | 426/623 X |
| 3,971,720 | 7/1976 | Swanson et al. | 210/196 |
| 4,018,899 | 4/1977 | Seckler et al. | 426/807 |
| 4,078,094 | 3/1978 | Katzen | 426/807 |
| 4,082,859 | 4/1978 | Katzen | 426/636 |

FOREIGN PATENT DOCUMENTS 12679 of 1899 United Kingdom .
558889 1/1944 United Kingdom .

OTHER PUBLICATIONS

Hackh's Chemical Dictionary, McGraw Hill Book Co., 4th Edition, 1969, pp. 314, 315, 452 and 453.
Celofos, A New Process Bulletin, Granot, Tel Aviv, Israel, Nov. 1976.

Primary Examiner—R. B. Penland
Attorney, Agent, or Firm—Fisher, Christen & Sabol

[57] ABSTRACT

A process which involves treating animal or poultry waste contained in a dropping pit or sedimentation tank of an animal or poultry confinement or holding pen with a sufficient amount of an acid to achieve and maintain the animal or poultry waste at a pH of about 4. Also, animal or poultry bedding material can be treated with acid (and after usage treated as above). The treatment eliminates the problems of the giving off of unhealthy gases and the growth of pathogens in the environment. The acid-treated waste material can be used as an animal feed or fertilizer ingredient.

14 Claims, No Drawings

PROCESS FOR IMPROVING THE HEALTH OF ANIMALS

BACKGROUND OF THIS INVENTION

1. Field of this Invention

This invention relates to a process for treating animal and poultry waste and bedding to eliminate the production of unhealthy gases and prevent an unhealthy environment.

2. Prior Art

Swine, cattle, poultry and the like are often grown in confinement (pens). The animal waste, i.e., feces (droppings) and urine, creates a number of health and environmental problems. The confinement pens usually have a slatted floor, wire floor or other type of floor with holes therein (for the animal waste to pass through).

Under intensive growing conditions, animals (or poultry) are crowded together and forced to live in a microenvironment dominated by a high concentration of their own fecal and urinary wastes. This causes an increase in ammonia ($NH_3$) and various gases produced by microbial fermentation, such as, methane ($CH_4$), carbon doixide ($CO_2$), etc., in their microenvironment. The effect is not only a relative reduction in oxygen ($O_2$) concentration in the air breathed by the animals but also the negative effects of these irritants on the metabolism of the animals. One effect that would serve as an example is the displacement of oxygen in the hemoglobin by ammonia thereby inducing partial asphyxiation.

The bedding (or litter) material contains manure or litter, and other animal or poultry waste material, after usage by animals or poultry. Various gases, such as ammonia, methane and/or putrification gases, e.g., as from cadavarine or putrecine, are given off. The result is an unhealthy situation that reduces animal performance and is an unhealthy environment for humans to be about. Pathogens are usually present.

U.S. Pat. No. 4,078,094 discloses a process for producing an animal feed or a fertilizer ingredient from animal manure which comprises acid solution and either wet or dry manure. The essentially basic minerals contained in the manure chemically react with the acid to form soluble salts. The acid and essentially basic minerals are used in a amount so that there is an equal molar reaction basis and so that sterilization of the manure is achieved. A slurry containing various solid fractions and an acid-water fraction is formed. The various fractions, each separated from each other, are recovered from the slurry.

U.S. Pat. No. 4,082,859 discloses a process for the conversion of cellulose and lignin organic waste materials into a more digestable and manageable form. The process includes reducing, if necessary, the cellulose or lignin organic waste material to a size to 2 inches or less. An acid selected from the group consisting of phosphoric acid, hydrochloric acid, sulfuric acid and mixtures thereof is admixed with about 40 to about 60 percent by weight of the organic waste material. Before, after or simultaneously with such admixing steps, a base selected from the group consisting of calcium hydroxide, sodium hydroxide, potassium hydroxide, ammonium hydroxide and mixtures thereof is admixed with the remainder of the organic waste material. The acidified waste material is mixed and reacted with the basified organic waste material, a more digestible form of said organic waste material resulting. About 80 to 120 parts by weight of the acidified organic waste material is used per 100 parts by weight of the basified organic waste material. Water is converted to steam by heat of such reaction provided the reaction mixture contains about 20 to 60 percent by weight, based on the total weight of the reaction mixture, of water. The reaction mixture is formed into pellets, cubes, blocks or other similar forms.

BROAD DESCRIPTION OF THIS INVENTION

An object of this invention is to provide a process for treating animal and poultry waste and bedding to eliminate the production of unhealthy gases and prevent an unhealthy environment. Another object of this invention is to provide a process for lower animal mortality, promote animal growth, improve feed conversion and provide animal feed or fertilizer components (or ingredients). Still another object is to provide a process that eliminates the above-noted prior art problems. Other objects and advantages of this invention are set out elsewhere herein or are obvious to one ordinarily skilled in the art herefrom.

The objects and advantages of this invention are achieved by the processes and compositions of this invention.

One embodiment of this invention involves a process which includes treating animal or poultry waste contained in a dropping pit or sedimentation tank of an animal or poultry confinement or holding pen with a sufficient amount of an acid to achieve and maintain the animal or poultry waste at a pH of about 4.

By using this embodiment of this invention, (1) faster growth is obtained, (2) lower mortality is obtained (most pathogens do not survive pH 4 or lower), (3) improved feed conversion is obtained, and (4) there is effective elimination of the usual unpleasant odors associated with animal or poultry operations.

By adding acid directly to the waste pits of animal or poultry pens, the acid separates the mineral from the organic material. The effluent immediately becomes essentially free of organic material and, on cleaning out the precipitated solids, a relatively inoffensive smelling material with a higher protein content than a comparable untreated pit is obtained.

The process of this embodiment of this invention sterilizes and deodorizes the animal manure as well as reduces the normal excess of mineral matter and renders the resulting fiber and protein fractions more easily digestible.

An acid solution (aqueous) is added to either (wet or dry) animal waste (manure). A chemical reaction takes place between the essentially basic minerals like calcium, potassium, sodium, magnesium, etc., contained in the manure and the acid to form soluble salts. An example of the preferred acid and concentration is hydrochloric acid (HCl) in a concentration varying between 0.25 and 6.0 N. The amount of acid used is that amount which is about equal on a molar (exchange or reaction) basis to the amount of essentially basic minerals present in the manure and which is necessary to achieve the sterilization desired. The amount of acid to be used can be estimated beforehand from the history of manure production by a certain number of animals. The chloride salts of the various minerals are soluble in the water fraction of the slurry created by the above process.

The acid can be an inorganic acid, such as, sulfuric acid ($H_2SO_4$), sulfurous acid, phosphoric acid ($H_3PO_4$), phosphorous acid, hydrochloric acid (HCl), boric acid, nitric acid, nitrous acid, hypochlorous acid, silicic acid and mixture thereof. The preferred acids are sulfuric acid, phosphoric acid and hydrochloric acid.

The acid or acids can each be added all at once or in batches or continuously. The acid or acids can be introduced, for example, by suitable metering devices.

The manure-acid solution (admixture) is mixed, preferably by slow stirring, during the time period when the chemical reaction takes place in the animal waste pits. The time period can be from a few minutes up to an hour. The solution is then allowed to settle until a clear separation has occurred between the various solid fractions and the acid-water solution. Separation of the treated animal waste in the pits can be achieved by other suitable separation means, such as, centrifugation, but gravimetric separation as described above is preferred as it is quite feasible and economical.

The separated acid-water solution is decanted from above the settled mass—this refers specifically to the gravimetric separation method, but the results are representative of all of the suitable separation means. Then the top-most layer of the settled mass usually containing 15 to 30 percent of protein is removed. This protein fraction (II) may represent one fourth of the original dry weight of the manure. The fibrous portion (II) lies just below protein fraction I and usually contains about 8 percent protein, about 15 percent ash and about 60 percent carbohydrate material, on an air dried basis. Fibrous portion II may represent one-half or more of the original dry weight of the manure. Finally, the lower-most layer (III) of insoluble mineral matter, i.e., silicates and other insolubles, is removed. This fraction (III) may be used as land fill or other building material. Protein fraction I and fiber fraction II are pressed to remove any free water-acid solution and are then dried in any convenient manner (e.g., using an alfalfa type type dryer, a belt dryer or a drum drier, or even sun dried where appropriate). Fraction II may be ensiled or mixed with other ingredients and fed without drying.

The mineral matter of the decanted acid water solution can be precipitated by adding an appropriate alkali, such as, CaOH (preferred), barium carbonate, aluminum hydroxide, potassium hydroxide, sodium hydroxide, sodium carbonate, strontium carbonate, calcium carbonate, zinc hydroxide, sodium hydroxide, magnesium carbonate, magnesium hydroxide and lithium hydroxide. Any hydroxide or carbonate of an alkali metal or alkaline earth metal can be used. The precipitate is dried to obtain its mineral fertilizer content, and the water left over the precipitation can be re-used in the process.

The acid-treated animal or poultry waste (manure) of this invention can be used as is, or formed into a convenient form, such as, pellets, cubes, blocks, powder, granules or other similar forms.

As stated above the acidification should be adjusted to an appropriate level, i.e., to a pH of 4 (in order to eliminate pathogens like Salmonella). Most of the bacteria will also be eliminated at such a pH, but there are, as is well known, certain bacteria which may require a lower pH for their elimination.

The recovery of the valuable fiber and protein fractions, after having obtained the water soluble salts, can be achieved by using any suitable or conventional recovery methods, so this invention is not limited to the stirring, setting and decanting procedures described above.

The process according to this invention may be carried out on a continuous basis, rather by than the batch system described above, by circulating acidified water through a continuous flow of manure feed.

When the acid solution and either wet or dry manure in the pit are admixed, the essentially basic minerals contained in the manure and the acid chemically react and soluble salts are formed. The acid is used on an equal molar exchange or reaction basis with the essentially basic minerals so that the soluble salts are formed and so that sterilization of the manure is achieved. A slurry containing various solid fractions and an acid-water fraction is formed. The fractions are gravimetrically separated. The soluble salts are precipitated from the acid-water fraction by the addition of an alkali, wherein an animal feed or a fertilizer ingredient results.

To repeat, for animal or poultry pens (houses), the process of this invention involves the addition of an acid, such as, hydrochloride (HCl), sulfuric ($H_2SO_4$), phosphoric ($H_3PO_4$), or almost any other acid, in an amount sufficient to maintain an approximate pH of 4. This amount can be calculated from the feed consumption of the pen which in turn determines the amount of ammonium hydroxide ($NH_4OH$) produced by the metabolic waste. The acid may be introduced manually or metered into the pits through a suitable plastic pipe fitted with nozzles. When the acidified solution is added to a droppings pit or settling tank in connection with confinement-reared animals, such as, swine, or cattle, or poultry, the process of this invention can become continuous with the advantage that various gases, such as, ammonia ($NH_3$), methane ($CH_4$) or putrification gases, e.g., from cadavarine or putrecine, are avoided. This (1) improves animal performance and the human environment and (2) permits the harvest of a nutritionally enhanced and pathogen free material.

Another embodiment of this invention involves a process which includes treating animal or poultry bedding or litter material with a sufficient amount of an acid to achieve and maintain the animal or poultry bedding or litter at a pH of about 4. The acid treated animal or poultry bedding or litter can be used in a confinement or holding tank for animals or poultry.

Bedding (or litter) material contains manure or litter, and other animal or poultry waste material, after usage by animals or poultry. Various gases, such as, ammonia, methane and/or putrification gases, e.g., as from cadavarine or putrecine, are given off. The result is an unhealthy situation that is an unhealthy environment for humans to be about. Pathogens are usually present. This embodiment of this invention eliminates those problems.

By using this embodiment of this invention, (1) faster growth is obtained, (2) lower mortality is obtained (most pathagens do no survive a pH of 4 or lower), (3) improved feed conversion is obtained, and (4) there is effective elimination of the usual unpleasant odors associated with animal or poultry operations.

It is also possible to increase the number of animals (poultry) per given area thereby reducing housing and labor costs inasmuch as the moisture transfer capacity of the bedding material is improved by the treatment of this embodiment of this invention.

The animal or poultry litter or bedding material can be organic waste material, for example, straw, such as, wheat, barley, oats and rice, stover, such as, corn and milo, cotton waste, grape pomice, vegetable wastes, wood shavings, sawdust garbage, such as, bagasse sugar cane bagasse, peanut hulls, peat tobacco stems, cocoa shells, rice hulls, soybean hulls and any other waste organic material. The preferred animal or poultry bedding or litter material is straw.

To repeat, for animals or poultry, the process of this invention involves producing an acid impregnated bedding material, such as, the conventional straw, stover, cotton gin waste, wood shavings, sugar cane bagasse, rice hulls, corn cobs, other vegetable waste, etc. The calculation for the amount of acid to be used is the same as used for the above described animal or poultry waste pit system. The acidification of bedding or litter material has the various stated advantages, and prepares the manure therein for further extraction.

The once treated bedding can be further treated with acid after it has been used for animal or poultry. This results in further extraction, etc. This is similar to the above-described manure treatment, so the description there is also applicable here.

The process of this embodiment sterilizes and deodorizes the manure containing bedding as well as reduces the normal excess of mineral matter and renders the resulting fiber and protein fractions more easily digestible.

An acid solution (aqueous) is added to which either the (wet or dry) animal waste-containing bedding. A chemical reaction takes place between the essentially basic minerals like calcium, potassium, sodium, magnesium, etc., contained in the manure and the acid to form soluble salts. An example of the preferred acid and concentration is hydrochloric acid (HCl) in a concentration varying between 0.25 and 6.0 N. The amount of acid used is that amount which is about equal on a molar (exchange or reaction) basis to the amount of essentially basic minerals present in the manure, etc., and which is necessary to achieve the sterilization desired. The amount of acid to be used, can be estimated beforehand from the history of manure production by a certain number of animals. The chloride salts of the various minerals are soluble in the water fraction of the slurry created by the above process.

The acid can be an inorganic acid, such as, sulfuric acid ($H_2SO_4$), sulfurous acid, phosphoric acid ($H_3PO_4$), phosphorous acid, hydrochloric acid (HCl), boric acid, nitric acid, nitrous acid, hypochlorous acid, silicic acid, and mixtures thereof. The preferred acids are sulfuric acid, phosphoric acid and hydrochloric acid.

The reactor for the further acid treatment can be any suitable reactor.

The acid and bedding are mixed, preferably by slow stirring, during the time period when the chemical reacton takes place. The time period can be from a few minutes up to an hour or so. The solution is then allowed to settle until a clear separation has occurred between the various solid fractions and the acid-water solution. Separation can be achieved by other suitable separation means, such as, centrifugation, but gravimetric separation as described above is preferred as it is quite feasible and economical.

The acid-treated animal or poultry bedding of this invention can be used as is, or formed into a convenient form, such as, pellets, cubes, blocks, powder, granules or other similar forms.

Both acidifications should be adjusted to an appropriate level, i.e., to a pH of 4 (in order to eliminate pathogens like Salmonella). Most of the bacteria will also be eliminated at such a pH, but there are, as is well known, certain bacteria which require a lower pH for their elimination.

Before being further treated, the acid-treated organic waste material can be reduced in size (say not to exceed over 2 inches) by any conventional means (preferably by chopping or grinding). Size reduction facilitates further handling and subsequent chemical treatment. Grape pomice, cotton waste or other material with a initial small particle size need not be ground.

Concerning both embodiments of this invention, the processes of this invention are economical, the processing equipment is not elaborate, and the ingredients are cheap. The acids act both as an acidulating agents and a hydrolyzing agents. The amount of each acid and the total of the acids depends upon their strength, and amount of the basic material present and the amount of organic and animal waste. The acids hydrolyze the cellulose and/or lignin in the organic and animal waste materials into a more digestable material. The degree of hydrolysis generally depends on the amount of acids used and the temperature and time allowed for the reaction. The product of the process of this invention can be used as animal feed or in animal feed. They can be used to replace costly grains, hay and oilseeds in the formulation of diets for animals.

DETAILED DESCRIPTION OF THIS INVENTION

As used herein, the term animal includes non-human animals, such as, swine, cattle, goats, rabbits and horses.

As used herein, the term poultry includes chicken, turkeys and quail.

When conveying is used herein, it can be achieved by any convenient means, such as, by means of a belt, screw or pneumatic conveyor.

When mixing (or admixing) is used herein, it can be manual or power, and can be batch, intermittant continuous, etc. Preferably mixing is achieved by means of a continuous mixer, such as, a molasses mixer with an acid-inert liner.

The various steps of this invention are usually achieved at a temperature between 20° and 150° F. (unless freezing is a problem). Preferably room temperature is used.

The following examples illustrate this invention. As used herein, all percentages, ratios and parts are on a weight basis, unless otherwise stated herein or otherwise obvious herefrom to one ordinarily skilled in the art.

EXAMPLE 1

Swine manure in a waste (droppings) pit below a swine conversion-pen (with a flooring of slates) was treated daily with sufficient hydrochloride acid (32 percent) to achieve a pH of 4. The manure was sterilized. Little in the way of offensive odors was noticed. The effluent in the pit was removed and the solids, having a high protein content, were useful as a feed ingredient.

EXAMPLE 2

Straw was treated (impregnated) with sufficient sulfuric acid (35 percent) to achieve a pH of 4. The acid-treated straw was used as bedding for poultry. After usage for a week, the bedding contained poultry litter. The acid-treated straw was then chopped to a size not exceeding 2 inches in length. The chopped straw, phosphoric acid (75 percent), sulfuric acid (96 percent), hydrochloric acid (32 percent) and water were admixed in a conventional continuous cold molasses mixer having a polyethylene liner (acid resistant). The resultant material was usable as an animal feed ingredient.

What is claimed is:

1. A process for improving the health of a confinement-reared non-human animal which consists of treating bedding or litter material of said animal or droppings of said animal in a dropping pit of said animal or in a sedimentation tank of said animal, said sedimentation tank being located under where said animal is confined, with a sufficient amount of an aqueous solution containing an acid to achieve and maintain said bedding or litter material of said animal or said droppings in said dropping pit or sedimentation tank at an acid pH during the period of production and confinement of said animals, the acid being an inorganic acid which is hydrochloric acid, sulfuric acid, sulfurous acid, phosphoric acid, phosphorous acid, hydrochloric acid, boric acid, nitric acid, nitrous acid, hypochlorous acid or mixtures thereof.

2. The process as claimed in claim 1 wherein said treating step is conducted on said bedding or said litter.

3. The process as claimed in claim 2 wherein the acid is added batchwise.

4. The process as claimed in claim 2 wherein the acid is added continuously.

5. The process as claimed in claim 2 wherein a pH of about 4 is achieved and maintained in said bedding or litter material.

6. The process as claimed in claim 5 wherein said bedding or litter material is straw, stover, cotton gin waste, wood shavings, bagasse, corn cobs or garbage.

7. The process as claimed in claim 1 wherein said treating step is conducted on the droppings in said dropping pit.

8. The process as claimed in claim 7 wherein the acid is batchwise.

9. The process as claimed in claim 7 wherein the acid is added continuously.

10. The process as claimed in claim 7 wherein a pH of about 4 is achieved or maintained in said droppings in said dropping pit or sedimentation tank.

11. The process as claimed in claim 2 wherein said animal is a swine, a cattle, a goat, a rabbit, a horse or a poultry.

12. The process as claimed in claim 11 wherein said poultry is a chicken, a turkey or a quail.

13. The process as claimed in claim 7 wherein said animal is a swine, a cattle, a goat, a rabbit, a horse or a poultry.

14. The process as claimed in claim 13 wherein said poultry is a chicken, a turkey or a quail.

* * * * *